United States Patent [19]

O'Connor

[11] Patent Number: 4,932,360

[45] Date of Patent: Jun. 12, 1990

[54] DISPOSABLE LITTER BOX AND PACKAGE

[75] Inventor: James A. O'Connor, 8 Russett La., Ulster Park, N.Y. 12487

[73] Assignee: James A. O'Connor, Ulsier Park, N.Y.

[21] Appl. No.: 331,281

[22] Filed: Mar. 30, 1989

[51] Int. Cl.⁵ .............................................. A01K 29/00
[52] U.S. Cl. ...................................... 119/1; 206/45.31
[58] Field of Search .......................... 119/1; 206/45.31

[56] References Cited

U.S. PATENT DOCUMENTS

| 1,230,401 | 6/1917 | Gold | 206/495 |
| 2,541,173 | 2/1951 | Moore | 206/45.31 |
| 2,645,337 | 7/1953 | Stienger | 206/45.31 |
| 4,441,451 | 4/1984 | Neal | 119/1 |
| 4,711,198 | 12/1987 | Mossbarger | 119/1 |
| 4,763,603 | 8/1988 | Coes | 119/1 |
| 4,788,935 | 12/1988 | Bella et al. | 119/1 |
| 4,807,564 | 12/1989 | Soberg et al. | 119/1 |
| 4,872,430 | 10/1989 | Shepard | 119/1 |

Primary Examiner—Paul J. Hirsch

[57] ABSTRACT

An entirely disposable pet litter apparatus consisting of a rectangular box, resilient bag, and an insert to hold the bag against the inner walls of the container. A portion of the top wall of the container is removed creating a window to view the contents. The rectangular box can be constructed with corrugated cardboard with an FOL type design with locking tabs which reduces the need for adhesives during manufacture. Optional detachable supports and a bag cover can be installed through slits in the wall of the box to create of fully enclosed pet litter apparatus.

38 Claims, 9 Drawing Sheets

DISPOSABLE LITTER BOX AND PACKAGE

REFERENCES CITED

| U.S. PATENT DOCUMENTS | | | |
|---|---|---|---|
| 4,305,544. | 12/1981 | Stanworth | 229/35 |
| 4,685,420. | 8/1987 | Stuart | 119/1 |
| 4,711,198. | 12/1987 | Mossbarger | 119/1 |
| 4,763,603. | 8/1988 | Coes | 119/1 |
| 4,776,300. | 10/1988 | Braddock | 119/1 |
| 4,779,566. | 10/1988 | Morris | 119/1 |
| 4,787,335. | 11/1988 | Carlyon | 119/1 |
| 4,788,935. | 12/1988 | Bella et al | 119/1 |
| FOREIGN PATENT DOCUMENTS | | | |
| 3500498 | 1/1985 | West Germany | 119/1 |

BACKGROUND OF THE INVENTION

Conventional animal litter containers have in general been used to limit animal waste contamination to small areas. In general, these containers have been somewhat rectangular shaped box structures often made of plastic or other similar rigid or semi-rigid noncollapsible material. Animal litter containers have been used in home appliations for animals such as cats and rabbits. These animals have been trained to excrete their waste, urine and feces, into these containers.

FIG. 1 depicts a typical animal waste container currently used in home applications. Litter container 10 is often made of plastic which makes it noncollapsible, semi-rigid and resistant to moisture. The container 10 is generally filled with an absorbant material such as dried clay or processed alfalfa. This material reduces odor through the absorption of moisture. Material of this type loses its ability to absorb moisture after repeated exposure to animal waste. Periodically, when the absorbant material becomes fully contaminated by the waste, it is replaced.

On occasion a disposable moisture resistant film, often polyethylene, is used to prevent animal waste and waste contaminated absorbant material from coming in contact with the inner walls of the container. Sometimes this film is in the form of a plastic bag. The bag is pulled over the container and then discarded with the litter once the litter is exhausted. At times, a rim lid is used to hold the disposable bag in place and prevent animals from displacing waste and contaminated absorbant material out of the container when it is being used. These rigid and semi-rigid noncollapsible lids are typically cleaned and reused, not discarded.

FIG. 1 also illustrates enclosed cover 12, a variation to common animal litter used in conjunction with container 10. Pets enter the litter container through 15, an opening in enclosed cover 12. Cover 12 is made from a rigid or semi-rigid material, often plastic. Enclosed cover 12 is used in place of a rim lid to holds a disposable bag in place when the bag is pulled over container 10. In addition, enclosed cover 12 prevents waste from being displaced out of the container when it is being used. By inhibiting the free flow of air over the waste, said container cover reduces odor produced by the waste. Again, these rigid and semi-rigid noncollapsible rim lids and enclosed covers are typically cleaned and reused, not discarded.

Noncollapsible reusable animal litter containers, such as those just described, have some significant draw backs and disadvantages. Periodically, these containers need to be cleaned and the absorbant material replaced. This task is unpleasant and exposes the individual directly to the waste which is unsanitary and a potential health hazard. Container liners are only partially effective in preventing waste and contaminated absorbant material from contacting the container. Containers with liners often become contaminated with urine. The area surrounding the container frequently becomes contaminated with urine, feces, and contaminated absorbant material. Containers often remain in the same area. Contaminants can permanently damage areas such as the floor surrounding these containers.

Some pet owners periodically travel with their animals. Transporting an animal to another location currently can involve considerable effort and a number of unpleasant tasks. The process typically involves the following steps. The non-collapsible rigid and semi-rigid waste container and associated cover are emptied and cleaned. The area surrounding the container is cleaned and the waste disposed. The container is packed together with an unused package of absorbant material and possibly a container liner. When the destination is reached the container is unpacked, the liner inserted, and the container filled with the absorbant material. Filling the container with absorbant material can produce a fine air borne dust that can be unpleasant to inhale. The entire process is repeated on the return leg of the trip.

More recently, various forms of fully disposable litter boxes have been proposed and in some cases patented. None are widely available commercially. Structures include numerous configurations of cardboard, plastic, and films such as polyethylene. All have significant drawbacks. U.S. Pat. No. 4,763,603 suggests that an adhesive or glue could be used to secure the resilient film to the cardboard box. This can be prohibitively expensive to manufacture. Adhesives used with polyethylene film do not provide strong bonds due to the nature of the material. The package can be complex and difficult to manufacture. It also makes no attempt to provide a version of the enclosed covered container that have become so popular.

U.S. Pat. No. 4,799,935 requires a drawstring bag to provide support for the structure. The device only provides a variation of the covered type container not the single tray. When used as a litter package it is not air tight nor does it appear to be easily made air tight. Litter would tend to escape during shipment or handling.

Other patents and inventions I have examine and reference have drawbacks as well.

SUMMARY OF THE INVENTION

The present invention relates to improvements in animal litter boxes. The invention provides a collapsible, fully disposable litter container and a convenient absorbant material portable package. The invention is initially a litter package that can be fashioned into a flat tray or a fully enclosed disposable litter box. One form of the litter package is constructed with an air tight polyethylene film bag, a card board bag-support insert and a cardboard FOL (Full Overlapped) container. Except for the initial construction of the FOL container the entire package can be fashioned without the use of glue or adhesives. Optional cardboard supports and a bag to enclose the structure are also provided. Many of the other objectives are presented here to help achieve this end.

One objective is to provide an inexpensive fully disposable and collapsible container in which the container, waste, and waste contaminated absorbant material can be easily and conveniently discarded after use.

Another objective is to provide a disposable container that eliminates direct contact with the contaminants as occurs when cleaning a noncollapsible-reusable container. The unpleasant tasks and time associated with cleaning a noncollapsable-reusable container are eliminated.

Another objective is to provide a single container that can be configured into either the conventional flat tray or the covered enclosed container.

Another objective is to construct a disposable-collapsible container of materials sufficiently low in cost and complexity to make large scale manufacturing practical.

Another objective is to provide a virtually air-tight portable package for the litter that can be converted into a collapsible-disposable litter box.

Another objective is to provide a means for securing a protective resilient film to the litter box without the use of adhesive or glue.

Another objective is to provide a covered-enclosed container that has a self supporting structure not dependent on the elasticity of a drawstring bag for support.

Another objective is to provide additional protection to the area surrounding the container through the use of a multiple layers of protective film.

Another objective is to provide a combined disposable container and package for animal waste absorbant material. In this way it is no longer necessary to purchase the absorbant material separately and refill the container after cleaning.

Another objective is to make travel with pets easier by providing a combined portable collapsible-disposable container and animal waste absorbant material package. This would eliminate the effort and tasks required to prepare, transport, and set up a noncollapsable-reusable container and associated materials.

Another objective is to reduce, virtually eliminate many inadequacies associated with conventional noncollapsable animal waste containers. This includes the necessity to clean the area surrounding the container.

Another objective is to provide additional protection from contaminants to areas surrounding waste containers.

These and other objectives will be readily evident upon study of the drawings and specification.

DESCRIPTION OF THE FORM OF THE INVENTION

FIGS. 2 through 9 illustrate the present preferred form of the invention which includes a disposable waste container 40 of generally conventional construction of paperboard, cardboard, corrugated cardboard, or like stiff or semi-stiff material. The inside of this container 41 is made contaminant resistant. This is achieved through the use of a moisture resistent resilient film liner such as a polyethylene film. Waste container 40 can be used by itself or in conjunction with the features and components described in subsequent text. Unlike conventional noncollapsible waste containers, container 40 is constructed of material which allows it to be folded and collapsed into itself which is more convenient for disposal.

Figure 1:
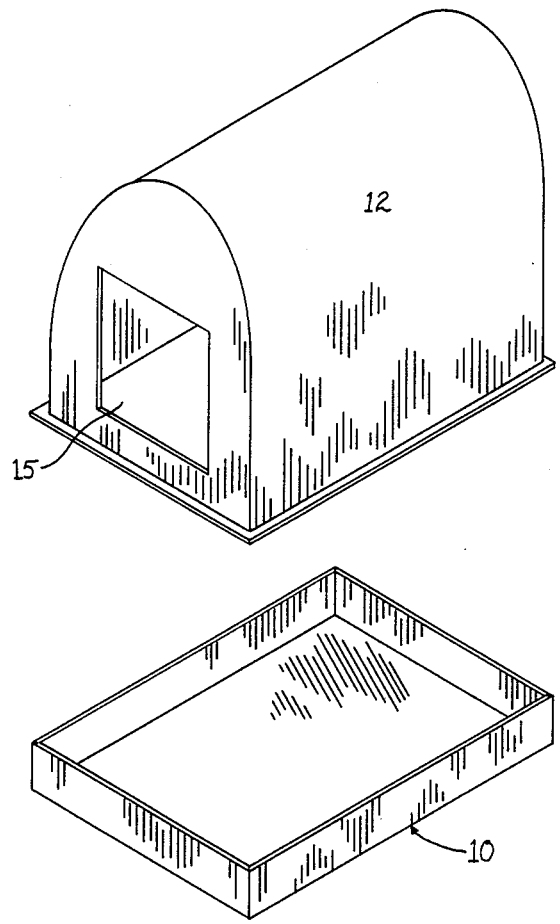
FIG. 1 is an exploded perspective view of a typical noncollapsible-reusable animal waste container 10 currently available for home use with removable noncollapsible enclosed cover 12 with front opening 15.
Figure 2:
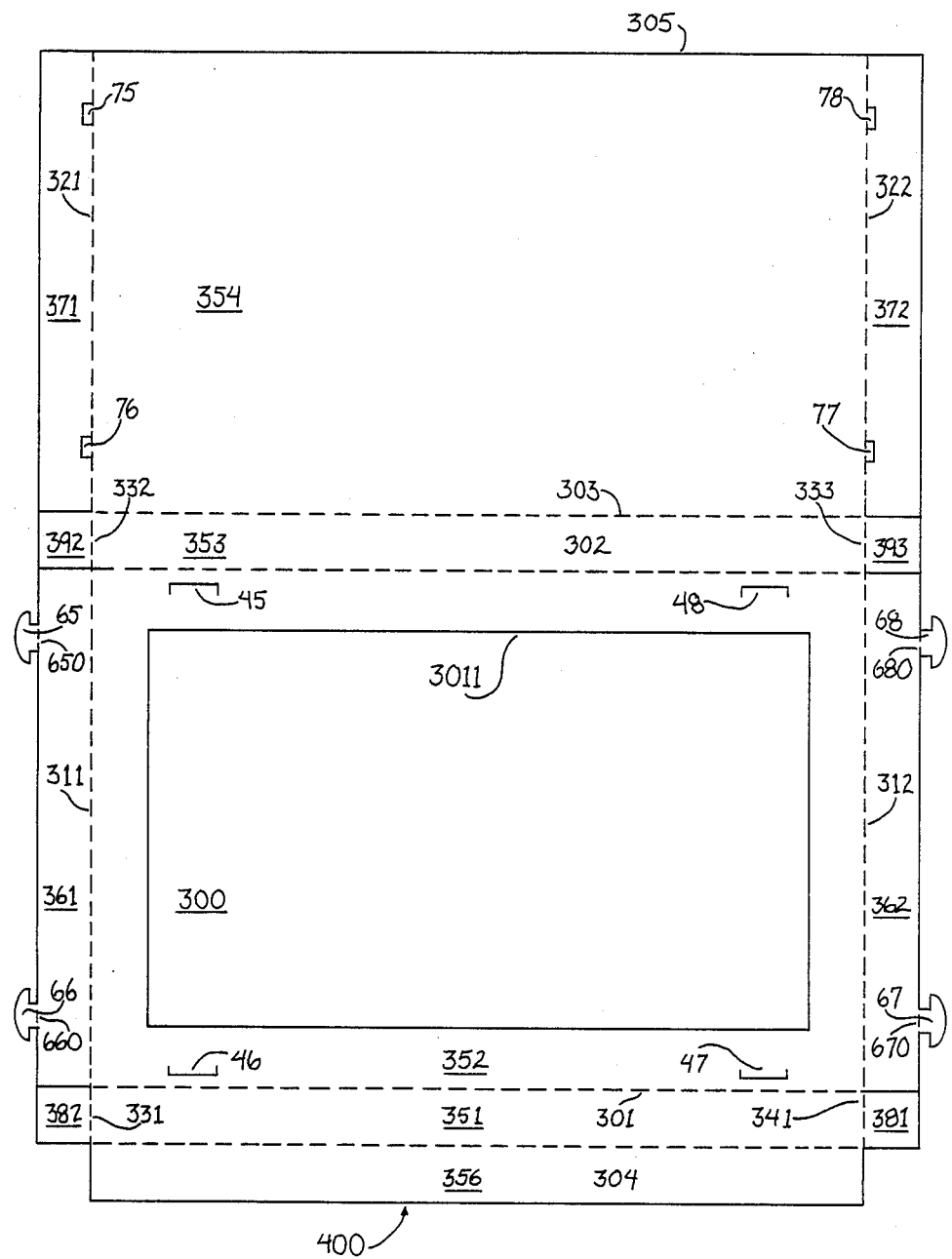
FIG. 2 is a top plan view of a FOL blank 400 from which the collapsible-disposable waste container 40 can be made.

The container 40 can be constructed from the use of blank 400 made of a material such as cardboard as depicted in FIG. 2. Use of a blank facilitates storage and shipping. When desired, the container can be readily assembled for use in a manner well known in the art. FOL (Full Overlapped) type blank 400 is just one example of many possible methods for constructing a device with the same desirable attributes as container 40. This example is offered only in the interests of being complete and in no way intended on being limiting.

Figure 3:
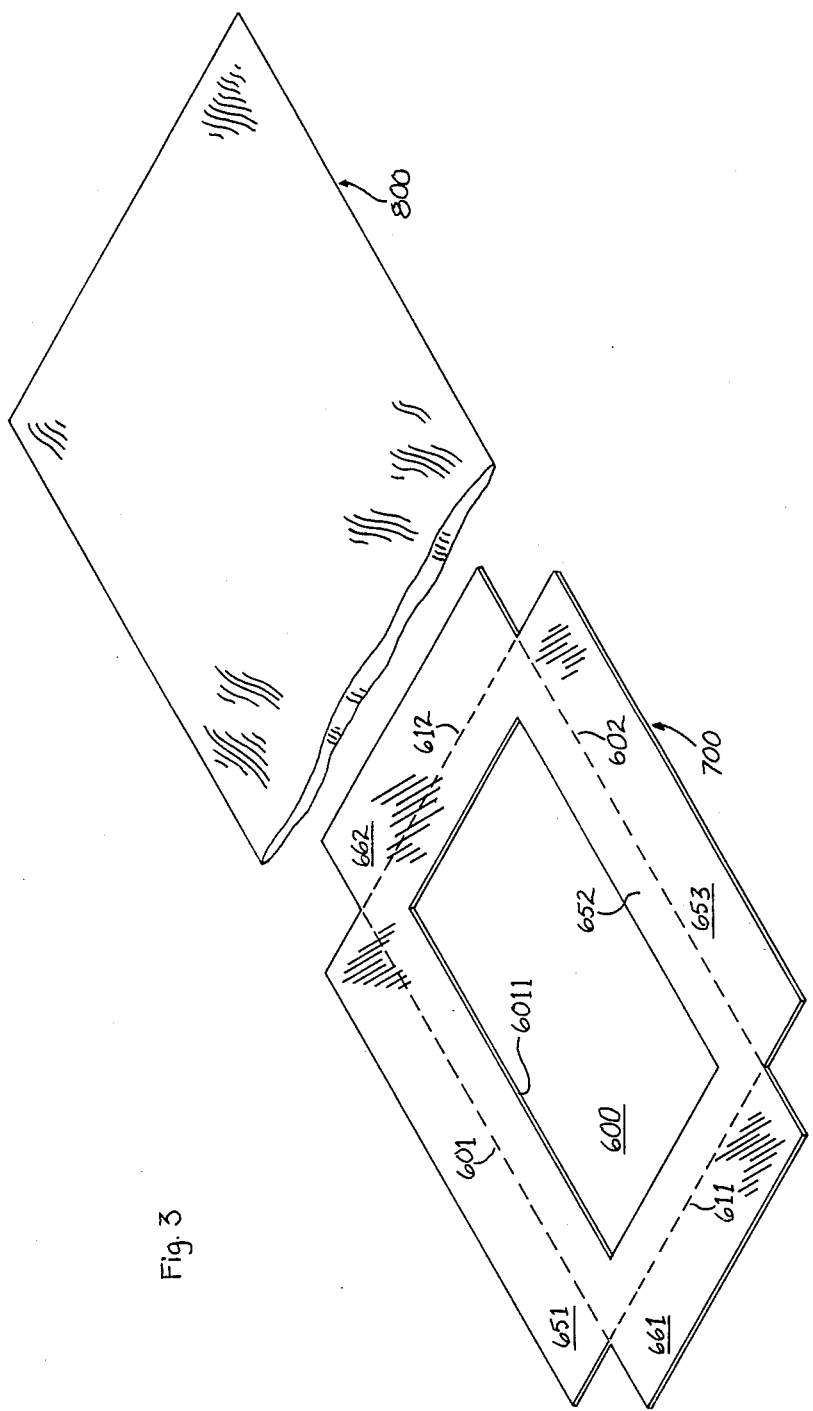
FIG. 3 is an exploded perspective view of a liner bag support insert blank 700 and flat liner bag 800 from which a portion of the collapsible-disposable waste container 40 can be made.
Figure 4:
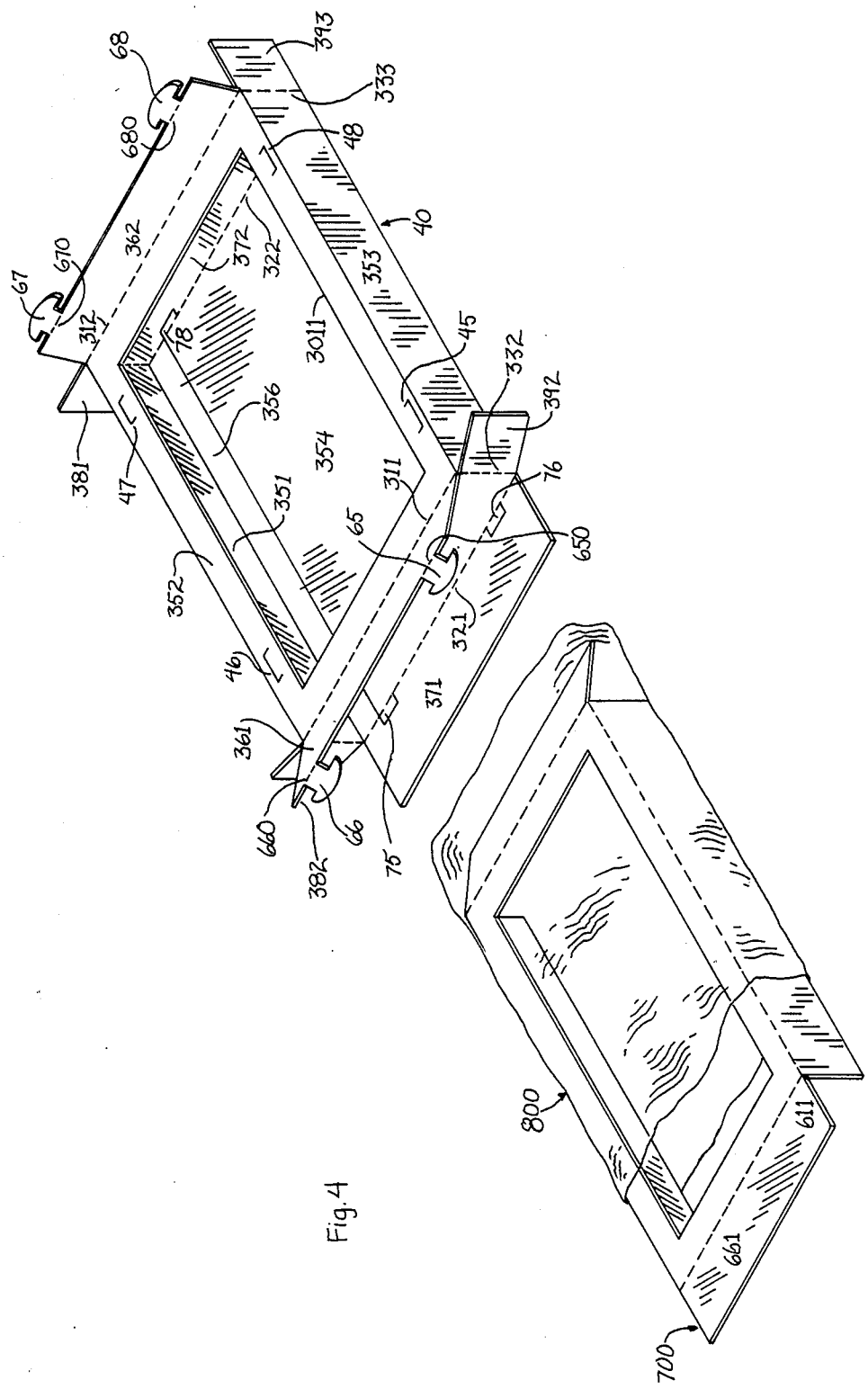
FIG. 4 is an exploded perspective view of the collapsible-disposable waste container 40, flat liner bag 800, and liner bag support insert blank 700 which has been partly inserted into liner bag 800.

Referring now in detail to the drawings particularly FIGS. 2, 3, and 4 numeral 40 designates an assembly embodying the invention which may be constructed from a single blank 400 and 700 of cardboard or the like stiff or semi-stiff material and flat bag 800 which may be constructed from any resilient material such as a polyethylene film.

Blank 400 comprises a rectangular section 354 which will constitute the bottom wall of the FOL type container when assembled. Section 356 is folded upward along parallel side fold line 304 until perpendicular to the plane of 351. Section 356 is attached to section 354 when they are placed together in substantially co-planar registry so that fold line 304 would meet and rest parallel to line 305 yet not interfere with the free movement of sections 371 and 372.

Extending from one side of 354 and foldable upward from said section about parallel side fold 303 sections 353 which constitute one of two side walls of the container.

Extending from opposite sides of 354 and foldable upward from said section about parallel side fold lines 321, 322 are symmetrically disposed sections 371, 372 which constitute the internal side walls of the container.

Sections 371, 372 have rear sections 75, 78 and front sections 76, 77 removed. Said sections are holes in the blank in which rear sections 65, 68 and front sections 66, 67 are inserted. These sections will be described in more detail later.

Sections 371, 372 are rotated upward about fold lines 321, 322 until they are perpendicular to the plane of section 354.

Extending from opposite sides of section 352 and foldable upward from said section about parallel side folds 301, 302 are symmetrically disposed sections 351, 353 which constitute sidewalls.

Section 353 has symmetrically disposed side sections 392, 393 connected at fold lines 332, 333 which are rotated upward until perpendicular to section 353 and placed inside of sections 371, 372 during assembly.

Rectangular section 352 constitutes the top wall of the container when it is assembled. Extending from opposite sides of section 352 and foldable upward from said section about parallel fold lines 311, 312 are symmetrically disposed sections 361, 362 which constitute external side walls of the container.

Sections 361, 362 have rear locking tab sections 65, 68 connected at fold lines 650 and 680 and front locking tab sections 66, 67, connected at fold lines 660, 670.

Sections 361, 362 are rotated upward about fold lines 311, 312 until they are perpendicular to the plane of section 352.

Section 351 has symmetrically disposed side sections 382, 381 connected at fold lines 331, 341 which are rotated upward until perpendicular to section 351 and placed inside of sections 371, 372 during assembly.

Section 356 is attached to section 351 along fold line 304 which. Said section is rotated upward perpendicular to 351 along fold line 301. It is fastened, usually glued, to the inside of section 354 to form an FOL (full overlapped) type container.

Generally centrally disposed substantially rectangular section 300 is a smaller subsection of top wall 352 outlined by boarder line 3011. During manufacture section 300 would highlighted, removed, or perforated along boarder line 3011. In any case section 300 is removed prior to use.

Boarder lines 45, 46, 47, 48 designate areas associated with the installation of supports 43, 44 used in conjunction with the collapsible bag type cover 50. Supports 43 and 44 can be made identical and interchangeable. During manufacture these sections would be highlighted, removed, or perforated.

Sections 392, 393, 382, 381 provide additional support to the container and package but could be removed if desired.

Sections 371 and 372 in conjunction with holes 75, 76, 77, 78 are used to provide the locking function for sections 361 and 362 in conjunction with sections 65, 66, 67, 68. Sections 371 and 372 could be removed and sections 65, 68 extended to meet sections 66, 67 respectively. Fold lines 650, 660 and 670, 680 would be continuous and joined. This results in a non-locking container that could be opened and closed repeatedly if desired.

Referring now in detail to FIGS. 3 and 4 blank 700 comprises a rectangular section 652 which will constitute the top wall of the bag support inserted into the container during assembly. Extending from opposite sides of 652 and foldable downward from said section about parallel side fold lines 601, 602 are symmetrically disposed sections 651, 653 which constitute the internal side walls of the container. Bag insert 800 is pulled over bag support insert 700 along fold lines 601, 602 during assembly. Once assembled section 651 hold bag 800 securely against the inside of container wall 351 and section 653 holds the bag securely against inside of container wall 353 without glue or adhesives.

Extending from opposite sides of 652 and foldable downward from said section about parallel side fold lines 611, 612 are symmetrically disposed sections 661, 662 which constitute the internal side walls of the bag support. Once assembled section 662 hold bag 800 securely against the inside of container wall 372 and section 661 holds the bag securely against inside of container wall 371 without glue or adhesives.

Figure 5:
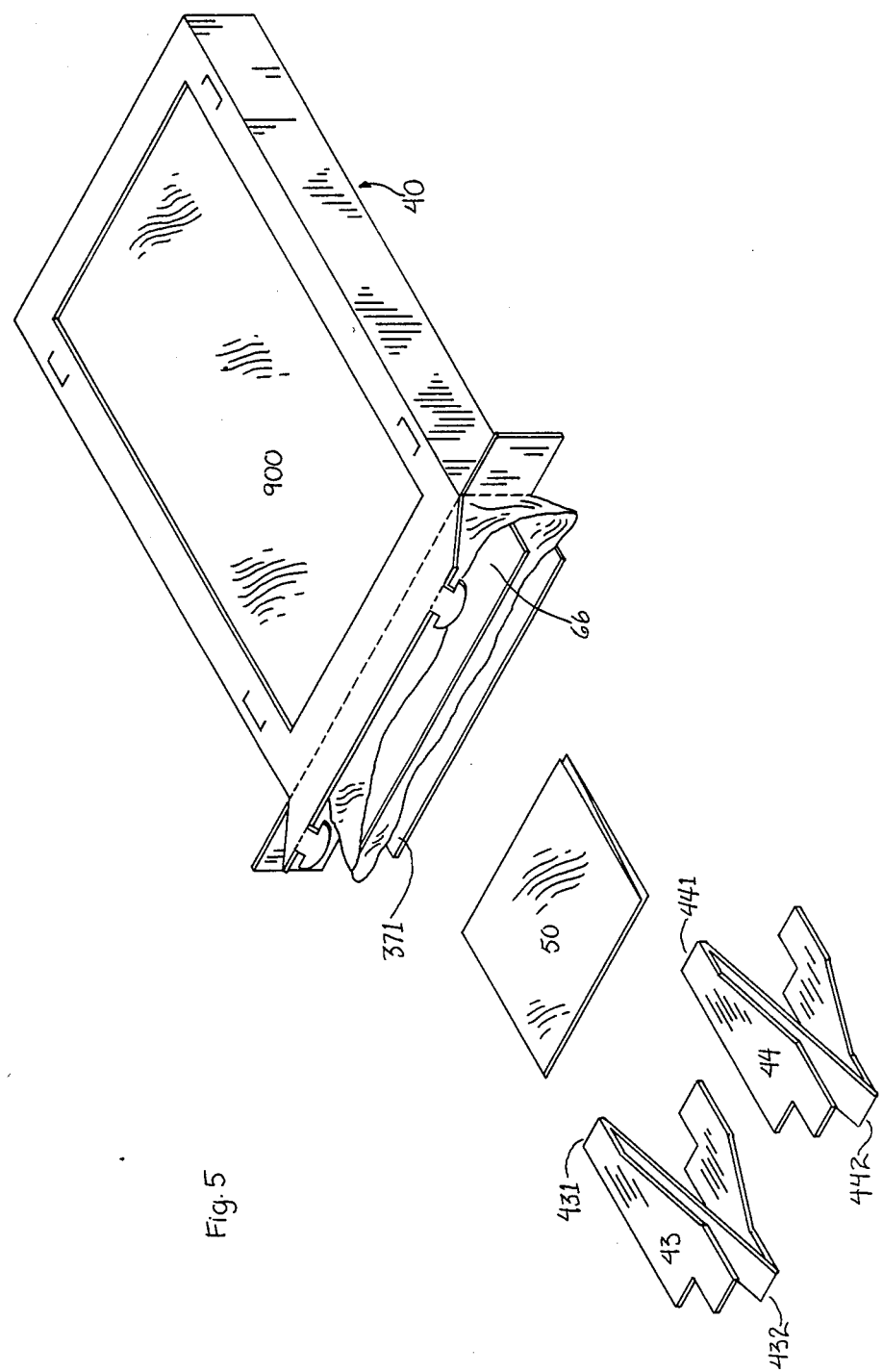
FIG. 5 is an exploded perspective view of the container 40 demonstrating how supports 43, 44 and bag cover 50 are inserted into the container during construction.

As illustrated in FIG. 5 section 661 can be folded up to meet the plane of section 652 to allow items to be inserted into the container during assembly.

Section 600 is a smaller generally centrally disposed substantially rectangular section removed from top wall section 652. Opening 600 can be made substantially equal in size to top wall section 652 and the side sections 651, 662, 653, 611 joined via foldlines along all but one of the edges perpendicular to fold lines 601, 612, 602, 611. Section 700 would then constitute a bag supporting insert strip used to hold the resilient bag against the inner walls of the container.

Figure 7:
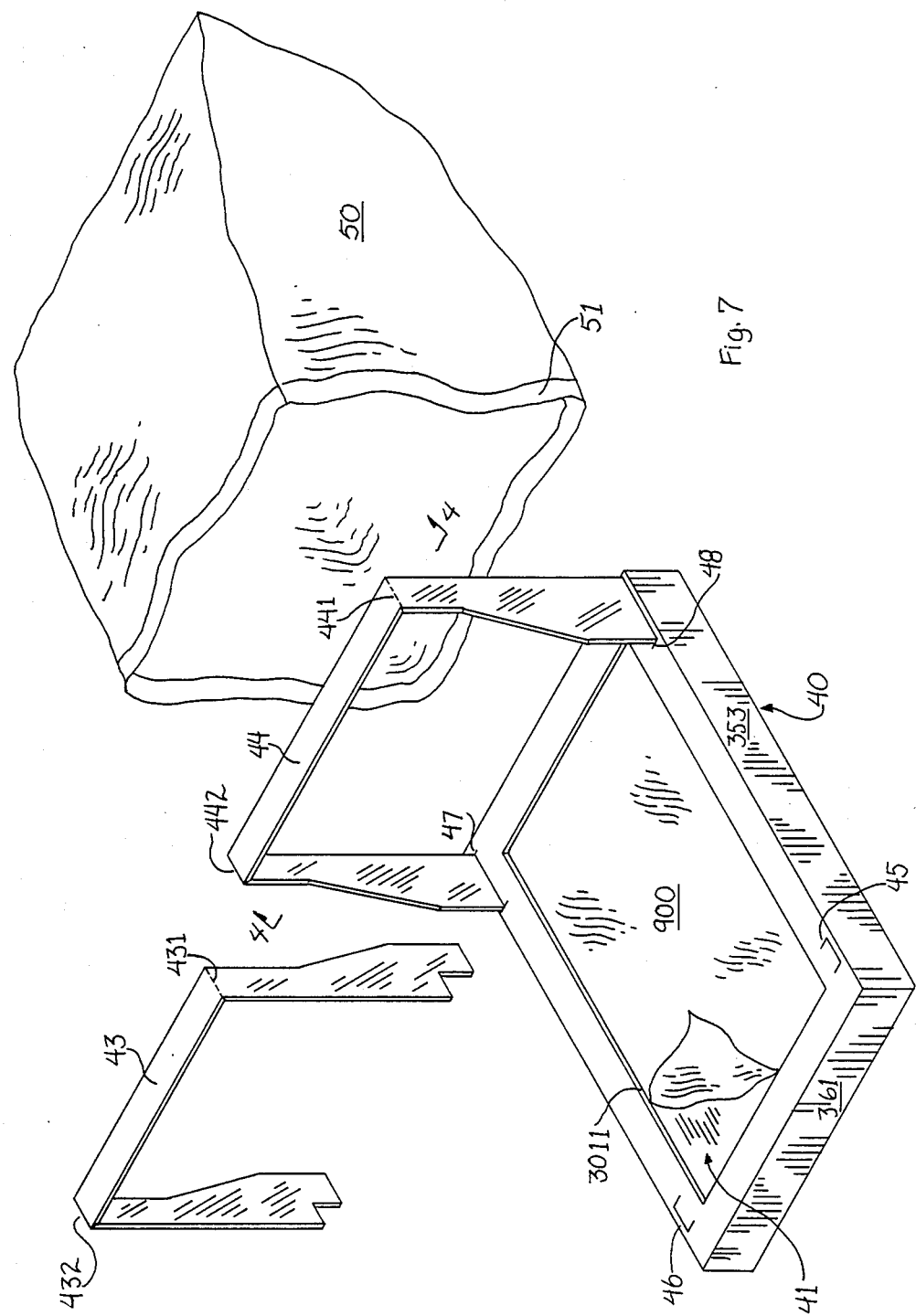
FIG. 7 is an exploded perspective view of container 40, support 43, and bag cover 50. Support 44 is shown inserted in container 40.
Figure 8:
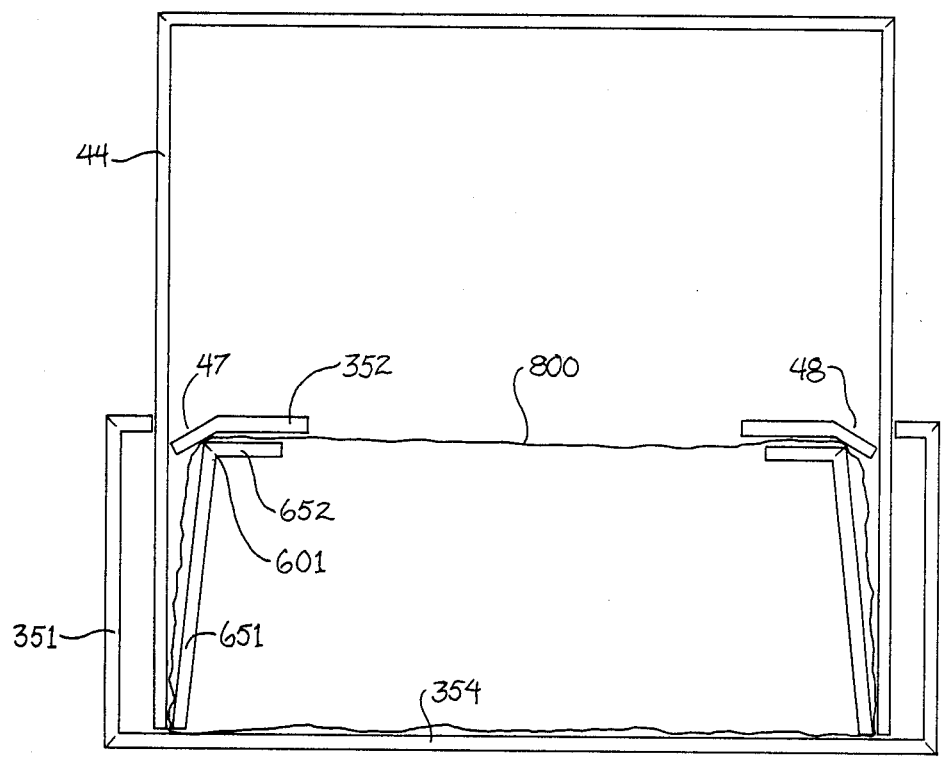
FIG. 8 is a vertical cross section taken along line 4—4.
Figure 9:
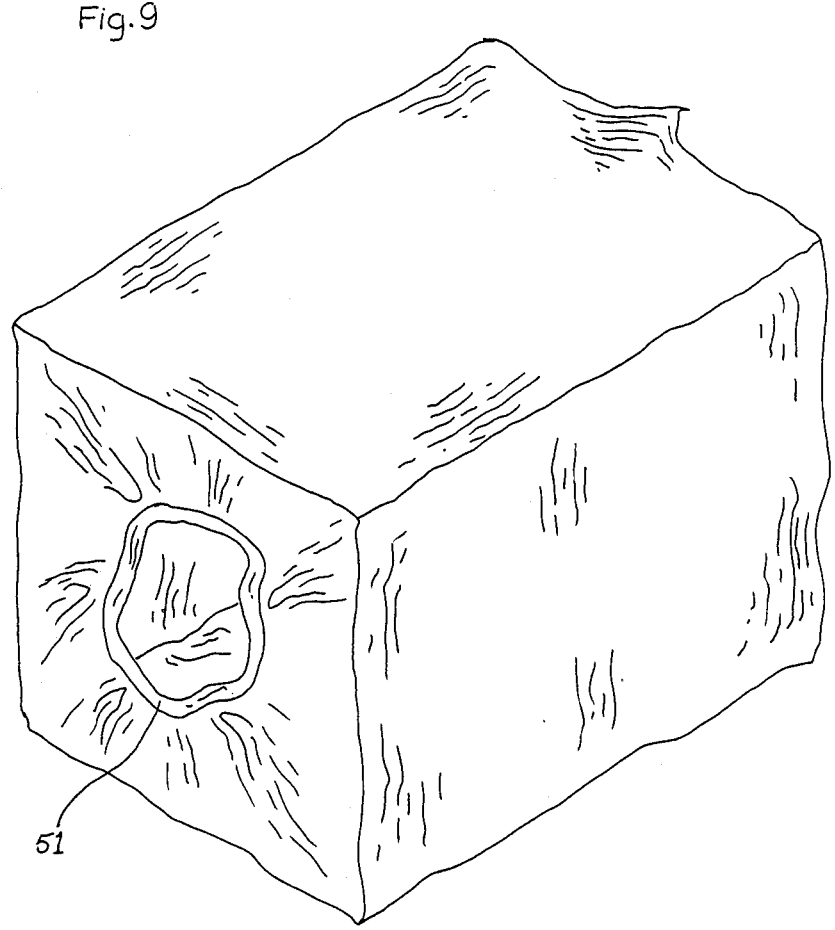
FIG. 9 is a perspective view of the current invention with bag cover 50 pulled over supports 43, 44 and the container.

Referring to FIGS. 4, 7, and 8 blank 700 is inserted into flat bag 800 to create assembly 900. This bag can be made of a single or multiple layer of material such as a polyethylene film. The side walls 661, 651, 662, 653 of insert 700 are rotated downward along fold lines 601, 612, 602, 611 until they are perpendicular to the plane of 652. Assembly 900 is then inserted into the FOL assembly 40. Insert walls 651, 662, 653 hold portions of the bag substantially against and in co-planar registry with container 40 walls 351, 372, 353.

One side of container 40 is closed by rotating sections 393, 381 inward along parallel fold lines 333, 341 until perpendicular to the plane of sections 351, 353. Section 372 is rotated upward along parallel fold lines 322 until perpendicular to the plane of 354. Sections 67, 68 are rotated downward along parallel fold lines 670, 680 until perpendicular to the plane of 362. Section 362 is then rotated downward along parallel fold line 312 until perpendicular to the plane of 352. Sections 67, 68 are inserted into holes 78, 77. Holes 78, 77 are slight smaller that sections 67, 68 allowing a locking type function to occur once inserted.

The other side of container 40 is closed first by rotating section 661 along parallel fold line 611 until perpendicular to the plane of 652. Of course this is done once everything has been inserted into the container. The open ends of bag 800 would then be sealed. Heat sealing if a polyethylene film would be the preferred method. Other methods including just folding the end together would be possible depending on the type seal desired, cost and manufacturing complexity.

The end of the container is then sealed by rotating sections 392, 382 inward along parallel fold lines 332, 331 until perpendicular to the plane of sections 351, 353. Section 371 is rotated upward along parallel fold lines 321 until perpendicular to the plane of 354. Sections 66, 65 are rotated downward along parallel fold lines 660, 650 until perpendicular to the plane of 361. Section 361 is then rotated downward along parallel fold line 311 until perpendicular to the plane of 352. Sections 66, 65 are inserted into holes 75, 76. Holes 75, 76 are slight smaller that sections 66, 65 allowing a locking type function to occur one inserted.

Figure 6:
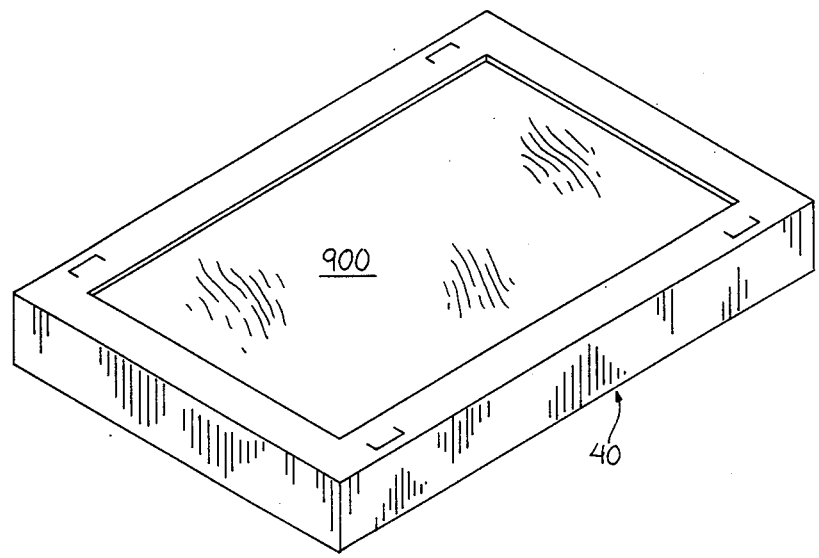
FIG. 6 is a perspective view of the current invention container 40, the collapsible-disposable litter box in it's form as a air-tight carton for shipping litter.

FIGS. 5, 6 illustrate one example of a combination collapsible disposable waste container and absorbant material portable package. Container 40 can be used as a economical portable package for animal waste absorbant material such a dried clay. The absorbant material can be inserted into the polyethylene bag during manufacture. The bag can then be heat sealed providing a substantially air-tight seal. This example is offered only in the interest of being complete and in no way intended on being limiting. Many other methods for constructing a device with the same desirable attributes are possible.

The bag can be made of single or multiple layers of a transparent or semi-transparent material such as a polyethylene film. In this form section 300 outline by boarder line 3011 would form a substantially transparent window making the contents of the disposable container package visible prior to use. A cord, string or fiber could be imbedded in the flexible bag along boarder line 3011. This would provide a pull string or pull tab configuration for removing the window prior to use. A perforation could be placed in the bag along boarder line 3011 to facilitate removal of the window prior to use. Opening 300 in said container 40 could be replace by a cardboard section with perforations along boarder line 3011 and removed prior to use. Again, these examples are offered only in the interest of being complete and in no way intended on being limiting. Many other methods for constructing a device with the same desirable attributes are possible.

A carrying handle could be added to the package if desired.

Elongated support 43 is inserted into holes 45, 46 and elongated support 44 is inserted into holes 48, 47. Support 43, 44 are used as a frame to support the collapsible bag type cover 50. Supports 43, 44 can be made from a flexible or semi-flexible material such as plastic, metal, cardboard, or other such suitable material. In this example cardboard has been chosen. FIG. 5 illustrates how supports 43, 44 can be folded flat and inserted into container 40 along fold lines 431, 432, 441, 442. FIG. 7 illustrate how detachable supports 43, 44 are configured to form a frame for the collapsible bag type cover 50. To facilitate disposal, the apparatus can be made collapsible by choosing a material for the detachable supports 43, 44 that the enables the supports to collapse by applying a small force to the outside of the bag cover. Cardboard or flexible plastic can be adapted to form collapsible detachable supports.

The tab sections at the extreme ends of supports 43, 44 that are inserted into the container have been set some distance away for the one edge of said supports that aligns with the side walls of the container when inserted. This allows the slits or perforations 45, 46, 47, 48 to be place way for the peripheral edges of the top wall of said container and thus does not degrade the from it's substantially rigid structure.

Referring now to FIGS. 4 and 7. Collapsible-disposable bag type cover 50 is made of moisture and contaminant resistant material such as polyethylene film or other such material. Bag cover 50 can be made from a single layer of film or multiple layer if additional protection is desired. Bag cover 50 is pulled under floor section 354, around side sections 351, 353 and over supports 43, 44. There are no restrictions on the dimensions of the collapsible-disposable bag type cover 50 except that it must be large enough to allow it to be pulled over and around the container and supports. By making the dimensions of the collapsible cover roughly the same proportions of the container with supports a secure fit would be ensured and the appearance would naturally be more aesthetically pleasing. Functionally however there is no additional dimensional restriction. A common plastic trash bag, of sufficient size, would be suitable as a bag type cover and indeed would provide additional cost benefits since they are currently readily available.

Section 51 extends around the entire front entry of the collapsible bag type cover 50. Section 51 can be composed of a flexible or elastic string shaped material that would exert a force over the bag cover pulling it tightly over the container and supports. Some ordinary plastic trash bags currently have self contained plastic tie straps that would be suitable in this application.

The cat litter apparatus comprising a bag insert holding a resilient bag substantially in co-planar registry with the inner walls of the container can be used to form a general purpose package. Said package could be constructed from cardboard, paperboard, plastic or other suitable rigid to semi-rigid material. Said package with resilient liner could be formed without the need for glues or adhesives from a cardboard blank or with a minimal amount of adhesive with a FOL type blank. Optionally it could contain a substantially transparent window and the locking tabs described earlier.

Obviously many other modifications and variations of the invention as here in before set forth can be made without departing from the spirit and scope here of.

While there has been here in described the presently preferred form of the invention, it is to be understood that various changes may be made therein within the scope of the appended claims.

What I claim is:

1. An entirely disposable pet litter apparatus comprising:
    (a) a container having a substantially rectangular bottom panel, two oppositely disposed substantially upright peripheral side walls, a substantially rectangular top wall with a smaller substantially rectangular generally centrally disposed opening in said top wall, oppositely disposed peripheral single or multiple front and rear pivotal flaps that connect with either the bottom, top or side walls and that mate with the opposite top, bottom or side walls to form substantially upright front and rear walls;
    (b) a bag support comprising a substantially rectangular top wall with a smaller substantially rectangular generally centrally disposed opening in said top wall, two oppositely disposed substantially upright pivotal peripheral side walls and oppositely disposed substantially upright pivotal peripheral front and rear walls, said bag support is inserted into said container is such a way that the top wall and opening of said container substantially align and are in co-planar registry with the top wall and opening of said bag support, and said bag support side, front, and rear walls substantially align and are in co-planar registry with said container side, front and rear walls;
    (c) a resilient flexible moisture resistant bag pulled around said bag support prior to said bag supports insertion into said container, said flexible bag is held near and substantially against the inner walls of the container by the bag support.

2. Disposable container means as in claim 1 in which the container and bag supporting insert are each made from a single cardboard blank.

3. Disposable container means as in claim 1 in which the resilient bag is made from multiple layers of resilient flexible material.

4. Disposable container means as in claim 1 in which the resilient bag is made from polyethylene film.

5. Disposable container as in claim 1 with locking tabs for the front and rear pivotal wall sections, said locking tabs have a substantially rectangular section extending from the front and rear pivotal flaps connected to a somewhat larger section, said larger section having a short section extending in the same plane but perpendicular to a first section and parallel to the side of the flap to which this locking tab is connected, said short extension forms a lip which is inserted into a somewhat smaller hole in the opposite flap, whereby once inserted the intrinsic resilience of the lip prevents the tab from being extracted from the hole thus forming a locking mechanism.

6. Disposable container as in claim 1 with a portion of said resilient bag visible through the opening in the top wall of said container forming a transparent or semi-transparent window section formed where the internal bag and the removed section of the top wall intersect and align.

7. Disposable container as in claim 1 with a pull tab or pull string configuration imbedded in said resilient bag that substantially aligns with the peripheral edge of the opening in said top wall, said pull tab or pull string facilitates the removal of a section of said resilient bag prior to use.

8. Disposable container as in claim 1 where perforations have been placed in said resilient bag, these perforations substantially aligns with the peripheral edge of the opening in said top wall facilitating removal of a section of said resilient bag prior to use.

9. Disposable container as in claim 1 with prepackaged cat litter therein that is used as a shipping container for the litter.

10. Disposable container as in claim 9 with a substantially air-tight resilient bag used to contain the litter.

11. Disposable container means as in claim 1 with a carrying handle attached to one of the sides of the container.

12. Disposable container means as in claim 1 in which a perforated section remains in place of the opening in the top wall of said container, said perforated section is removed prior to use, a hole or perforation is cut in the bag insert such that it substantially aligns in co-planar registry with the perforated section in the top wall of said container.

13. An entirely disposable pet litter apparatus comprising:
 (a) a container having a substantially rectangular bottom panel, two oppositely disposed substantially upright peripheral side walls, a substantially rectangular top wall with a smaller substantially rectangular generally centrally disposed opening in said top wall, oppositely disposed peripheral single or multiple front and rear pivotal flaps that connect with either the bottom, top or side walls and that mate with the opposite top, bottom or side walls to form substantially upright front and rear walls, slits or holes are placed in one or more of the walls to allow the connection of a detachable support;
 (b) a bag support comprising a substantially rectangular top wall with a smaller substantially rectangular generally centrally disposed opening in said top wall, two oppositely disposed substantially upright pivotal peripheral side walls and two oppositely disposed substantially upright pivotal peripheral front and rear walls, said bag support is inserted into said container in such a way that the top wall and opening of said container substantially align and are in co-planar registry with the top wall and opening of said bag support, and said bag support side, front, and rear walls substantially align and are in co-planar registry with said container side, front and rear walls;
 (c) a resilient flexible moisture resistant, bag pulled around said bag support prior to said bag supports insertion into said container, said flexible bag is held near and substantially against the inner walls of the container by the bag support,
 (d) detachable members that connect to the container forming a support structure,
 (e) a resilient flexible external bag cover with an opening at one end and enclosing the frame structure created by the support and container.

14. Disposable container means as in claim 13 in which the container, bag supporting insert, and detachable support members are each made from a single cardboard blank.

15. Disposable container means as in claim 13 in which slits are cut into the top wall of said container near the four corners in such a way as to allow a portion of a detachable support to be inserted and secured to said container by being pushed through the slits and between the outer wall of said container and said resilient bag, the side wall of said bag support pushes the resilient bag against the portion of said detachable support which in turn is pushed against the outer wall of said container.

16. Disposable container means as in claim 15 in which the slits are substantially semi-circular to semi-rectangular cuts or perforated cuts, the end of the cuts pointing substantially towards the opposite peripheral wall, creating a pivotal flap in which the intrinsic resilience of the said container material exerts a force on the portion of said detachable support once inserted into said container helping to hold it rigidly in place.

17. Disposable container means as in claim 15 in which two supports of rigid, semi-rigid or flexible material each having two oppositely disposed ends which are inserted through the slits in the top wall near opposite side walls of the container, whereby the supports form a substantially upright rigid to semi-rigid frame structure.

18. Disposable container means as in claim 13 in which the resilient bag is made from multiple layers of resilient flexible material.

19. Disposable container means as in claim 18 in which the resilient bag is made from polyethylene film.

20. Disposable container as in claim 13 with two detachable supports comprising an elongated cardboard strip, a top section of substantially rectangular shape connected, via a score in the cardboard, to pivotal oppositely disposed side sections that are substantially triangular in shape, at opposite ends of the support are substantially rectangular bottom tab sections connected to said side sections; both said tab sections at the end of each of the two detachable supports are inserted into oppositely disposed slits or holes in the top wall near opposite side walls of the container, one said support runs near and parallel to the front wall and the other said support runs near and parallel to the back wall whereby once inserted into the holes or slits in the container the said supports form a rigid to semi-rigid frame structure.

21. Disposable container as in claim 20 with said supports having insert tab sections placed away from one end of said support, allowing the other end of said support to substantially align with the end of said container yet allows holes or slits to be made in the top wall of the container away from the side walls preventing degradation of the substantially rigid structure of the walls that support the container.

22. Disposable container as in claim 13 with said flexible bag cover having draw strings or an elastic strap attached to the periphery of the open end of the bag for securing said bag around the frame structure, allowing no physical attachment of said drawstring or strap to support the frame.

23. Disposable container as in claim 13 with a portion of said resilient bag visible through the opening in the top wall of said container forming a transparent or semi-transparent window section formed where the internal bag and the removed section of the top wall intersect and align.

24. Disposable container as in claim 13 with a pull tab or pull string configuration imbedded in said resilient bag that substantially aligns with the peripheral edge of the opening in said top wall, said pull tab or pull string facilitates the removal of a section of said resilient bag prior to use.

25. Disposable container as in claim 13 where perforations have been placed in said resilient bag, these perforations substantially aligns with the peripheral edge of the opening in said top wall facilitating removal of a section of said resilient bag prior to use.

26. Disposable container as in claim 13 with prepackaged cat litter there in that is used as a shipping container for the litter.

27. Disposable container as in claim 13 with a substantially air-tight resilient bag used to contain the litter.

28. Disposable container means as in claim 13 with a carrying handle attached to one of the sides of the container.

29. Disposable container means as in claim 13 in which a perforated section remains in place of the opening in the top wall of said container, said perforated section is removed prior to use, a hole or perforation is cut in the bag insert such that it substantially aligns in co-planar registry with the perforated section in the top wall of said container.

30. Disposable container means as in claim 13 in which the bag type cover and supports are made from materials that allow the entire apparatus to collapse and be used as a waste receptacle, such as a trash bag for the disposal of the waste.

31. A general purpose package and container comprising:
   (a) a container having a substantially rectangular bottom panel, two oppositely disposed substantially upright peripheral side walls, a substantially rectangular top wall with a smaller substantially rectangular generally centrally disposed opening in said top wall, oppositely disposed peripheral single or multiple front and rear pivotal flaps that connect with either the bottom, top or side walls and that mate with the opposite top, bottom or side walls to form substantially upright front and rear walls;
   (b) a bag support comprising a substantially rectangular top wall with a smaller substantially rectangular generally centrally disposed opening in said top wall, two oppositely disposed substantially upright pivotal peripheral side walls and oppositely disposed substantially upright pivotal peripheral front and rear walls, said bag support is inserted into said container in such a way that the top wall and opening of said container substantially align and are in co-planar registry with the top wall and opening of said bag support, and said bag support side, front, and rear walls substantially align and arc in co-planar registry with said container side, front and rear walls;
   (c) a resilient flexible moisture resistant bag pulled around said bag support prior to said bag support insertion into said container, said flexible bag is held near and substantially against the inner walls of the container by the bag support.

32. General purpose package means as in claim 31 in which the container and bag supporting insert are each made from a single cardboard blank.

33. General purpose package means as in claim 31 in which the resilient bag is made from multiple layers of resilient flexible material.

34. General purpose package means as in claim 31 in which the resilient bag is made from polyethylene film.

35. General purpose package means as in claim 31 with locking tabs for the front and rear pivotal wall sections said locking tabs have a substantially rectangular section extending from the front and rear pivotal flaps connected to a somewhat larger section said larger section having a short section extending in the same plane but perpendicular to a first section and parallel to the side of the flap to which this locking tab is connected, said short extension forms a lip which is inserted into a somewhat smaller hole in the opposite flat whereby once inserted the intrinsic resilience of the lip prevents the tap from being extracted from the hole thus forming a locking mechanism.

36. General purpose package as in claim 31 with a portion of said resilient bag visible through the opening in the top wall of said container forming a transparent or semi-transparent window section formed where the internal bag and the removed section of the top wall intersect and align.

37. General purpose package as in claim 31 with a pull tab or pull string configuration imbedded in said resilient bag that substantially aligns with the peripheral edge of the opening in said top wall, said pull tab or pull string facilitates the removal of a section of said resilient bag prior to use.

38. General purpose package as in claim 31 where perforations have been placed in said resilient bag, these perforations substantially aligns with the peripheral edge of the opening in said top wall facilitating removal of a section of said resilient bag prior to use.

* * * * *